Patented Mar. 2, 1954

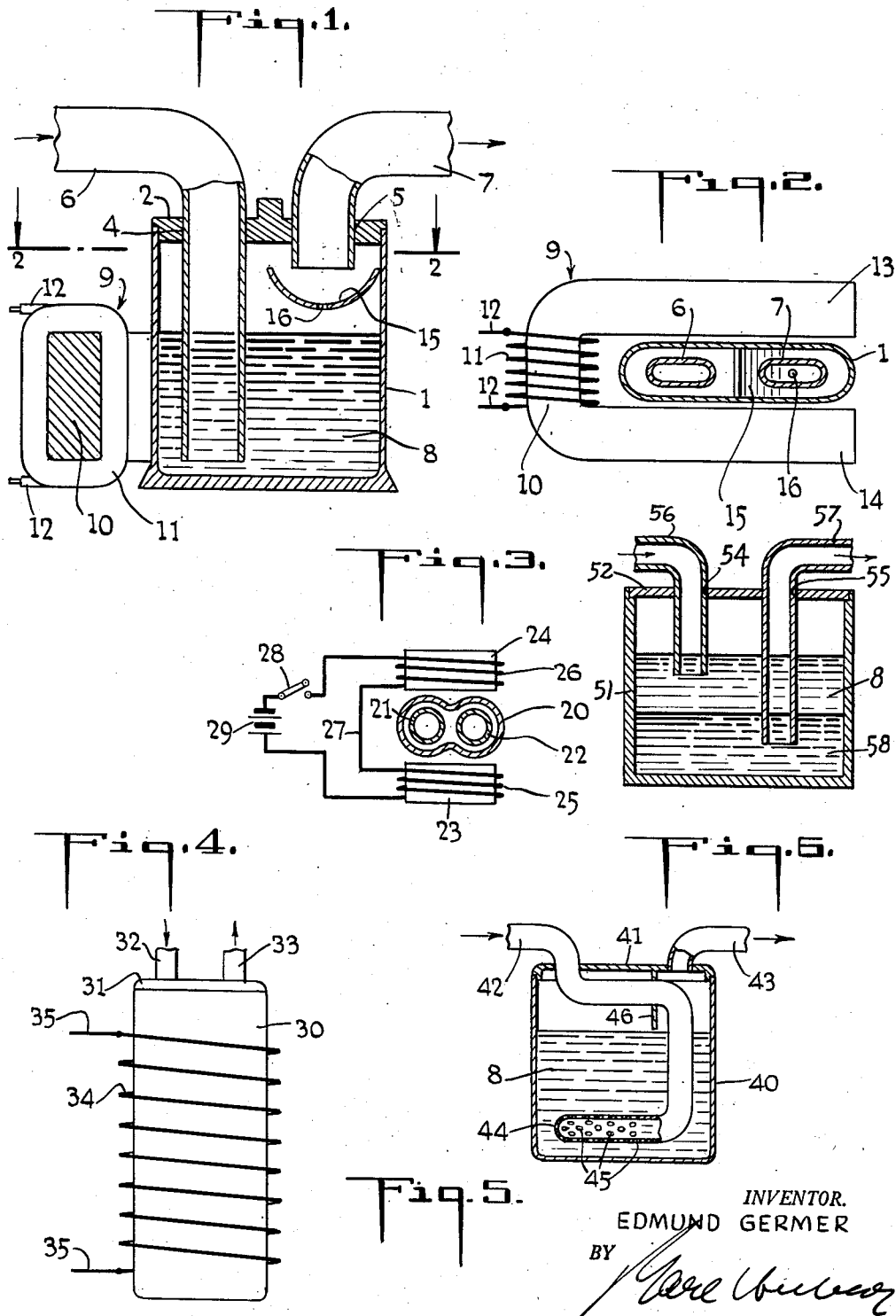

2,670,749

UNITED STATES PATENT OFFICE 2,670,749

MAGNETIC VALVE

Edmund Germer, Berlin-Wannsee, Germany, assignor to Hanovia Chemical & Manufacturing Company, Newark, N. J., a corporation of New Jersey Application July 20, 1950, Serial No. 174,926

Claims priority, application Germany July 21, 1949

11 Claims. (Cl. 137—1)

This invention relates to valves for controlling the flow of fluids and has for a general object the provision of a new and improved means and method for controlling the flow of fluids by a magnetic field.

According to the invetnion, the disadvantages that are inherent in fluid control devices having movable parts are eliminated, these disadvantages being, for example, the wearing out of valve parts and the loss in time, especially in critical operations, that occurs during the closing and opening of such valve devices.

Further objects and various advantages will become apparent from the following description of preferred forms thereof, reference being made to the accompanying drawings in which the reference numerals refer to similar corresponding parts in the several figures. The essential characteristics are summarized in the claims.

In said drawings:

Figure 1 is a vertical section of one form of the invention,

Figure 2 is a view taken on the line 2—2 of Figure 1,

Figure 3 is a view taken similar to view 2 but showing a modification thereof,

Figure 4 is a view of another modification of the invention,

Figure 5 is a cross-sectional view of still another modification and,

Figure 6 is a cross-sectional view of a further modification.

Broadly stated, the invention resides in the use of magnetic oil for controlling the flow of a fluid in a conduit by subjecting the oil to a magnetic field. When this magnetic oil becomes magnetized, it thickens to a semi-solid state in which condition it offers increased resistance to a flow of fluids passing through it.

Magnetic oil constitutes a colloidal suspension of microscopic particles of iron in a light oil. When this mixture of oil and suspended iron powder is subjected to a magnetic field the iron particles become attracted to each other and bind the oil between them to form a thick paste-like mass. This magnetic oil has been used heretofore in a new clutch mechanism invented by Jacob Rabinow and more fully described in Life Magazine of September 20, 1948, pages 5-58 inclusive. As indicated by the National Bureau of Standards Technical News Bulletin, vol. 33, No. 6, pp. 74-76 inclusive, the magnetic fluid mixture can advantageously be made of a carbonyl iron powder in a silicone suspension liquid whereas at extremely high-temperature applications fluorinated and chlorinated suspension fluids may be used.

I desire, however, to have it understood that I do not consider my invention to reside in the magnetic fluid per se, but rather in the method and the means for utilizing this known magnetic fluid for controlling the flow of a preselected fluid.

Referring now to Figures 1 and 2 of the drawings, reference numeral 1 designates a container formed of a nonmagnetic material, such as for example, glass, brass, plastic product, and the like. The container is provided with an opening at the upper end thereof that is closed by means of a cover or closure plate 2, said plate being mounted on the container in any suitable manner so as to provide a fluid tight chamber within the container. Fluid passes into the chamber through the inlet pipe 6 that is sealed in the opening 4 and extends down to the lower portion of the chamber. An outlet pipe 7 is sealed in the opening 5 and terminates in the upper portion of the chamber. The container 1 is partially filled with magnetic oil shown at 8, the amount thereof being such that its surface will lie between the ends of the inlet and the outlet pipes.

An electromagnet 9 having the usual metal core 10 with the coils 11 around the core is arranged outside of the container, and as more clearly shown in Figure 2, the core 10 may be U-shaped so that its sides 13 and 14 will extend along the side walls of the container. When the terminals 12 of the coil 11 are connected to a source of electric current, a magnetic field will be established between the sides or poles 13 and 14 of the electromagnet, thereby magnetically exciting the colloidal iron particles in the oil 8 and causing the oil to thicken as explained above.

When the assembled valve is connected into a conduit that carries a gas, the gas will bubble through the oil 8 and out through the outlet pipe 7. This gas flow may then be stopped by merely magnetizing the mixture 8 which instantaneously thickens into a stiff gel and prevents further flow of gas out from the inlet pipe. As the gas bubbles through the mixture 8, it may in some applications cause the oil to foam and be blown out through the pipe 7. To prevent this from occurring, I provide a baffle 15 that extends over the end of the outlet pipe and between the side walls of the container. The baffle is preferably perforated as shown at 16 to allow any oil that may become trapped in the baffle 15 to return to the bottom portion of the container. It will, of course, be obvious to those skilled in the art that the oil 8 may contain any well-known antifoaming agent to prevent oil from passing out of the container with the gas flow.

The device above described may also be used as a valve for controlling the flow of a liquid, provided, of course, that such liquid is immiscible with the oil and of a lesser specific gravity so that it may rise through the oil and pass out of the upper end of the container.

As shown in Figure 6, when it is desired to control the flow of a liquid 58 that is heavier than the oil 8 (the oil floats on the liquid 58), then obviously, the outlet pipe 57 sealed in opening 55 must be positioned in the lower portion of the container 51, in order to prevent loss of magnetic fluid through said outlet, particularly before initiation of operation. The inlet pipe 56 is sealed in cover plate 52, into the opening 54, and extends into the magnetic fluid.

No special means is required for magnetizing the mixture 8, i. e. this may be accomplished by means of single electromagnet, or a plurality of magnets as shown in Figure 3, or with a simple coil as shown in Figure 4. Also, the oil may be magnetically energized by means of a permanent magnet that can be moved around the container in order to control the flow of fluids through the container.

It will be apparent to those skilled in the art that my invention may be used for applications other than for completely stopping the flow of a fluid in a conduit. When it is desired to reduce the back pressure of the oil 8, any desired amount may be removed from the container. Since the stiffness of the mixture 8 depends in part upon the intensity of the magnetic field, it is obvious that this may be varied by changing the electric current that passes through the coils of the electromagnet, or by controlling the distance of the magnet from the container. These variables may be adjusted as desired in order to develop a pressure and stiffness of the mixture 8 that will meet the requirements of the user whether such requirements be that of completely stopping the flow of fluid or reducing said flow to a predetermined value.

The container 1 may be formed of interconnected portions of two cylinders as shown at 20 in Figure 3. In this embodiment, the inlet pipe 21 and the outlet pipe 22 are arranged concentrically in each cylindrical portion of the container 20. Also, I provide two separate electromagnets 23 and 24, one on each side of the container, and I show that coils 25 and 26 on the cores 23 and 24 may be connected in series by the connecting lead 27. The magnets may be energized by a source of current 29 upon operation of the switch 28.

In Figure 4, I show the use of a coil 34 that is wound around the container 30 having inlet 32 and outlet 33 mounted in the cover 31. This arrangement requires no core for establishing magnetic field, since when the coil is connected to a source of electric current through the terminals 35, the current passing through the coil will magnetize the iron particles in the mixture 8 sufficiently to cause them to be attracted to each other.

In order to reduce the extreme agitation of the mixture 8 that occurs in application when fluid is passed through the valve, under a relatively high pressure, it is desirable to provide an inlet pipe having small holes therein for dispersing the fluid in small bubbles or globules. This form of my invention is shown in Figure 4 wherein the container 40 has an inlet pipe 42 mounted in the cover plate 41. The end 44 of the inlet pipe is closed and in the horizontal section of the pipe are several perforations 45 through which the fluid passes into the mixture 8. Oil bubbles are prevented from passing through the outlet 43 by means of the baffle 46, which is preferably supported on the cover 41 and arranged to the right of the perforations 45 in the inlet pipe.

Although the present invention has been described in conjunction with preferred embodiments, it is understood that modifications and variations may be resorted to without departing from the spirit and scope of the invention, as those skilled in the art will readily understand. Such variations and modifications are considered to be within the purview and scope of the appended claims.

What I claim is:

1. The method of controlling the flow of a preselected fluid through a confined body of magnetic fluid which comprises subjecting the body of magnetic fluid to a magnetic field during the passage of the preselected fluid therethrough.

2. The method of controlling the flow of fluid through a conduit comprising suspending fine iron powder in an oil, interposing a confined body of said iron-oil mixture into said flow conduit and subjecting said mixture to a magnetic field during the passage of the fluid therethrough to partially gel said mixture whereby increased resistance is offered to the flow of said fluid.

3. A device for controlling the flow of a preselected fluid comprising a container having an inlet and an outlet opening, a body of magnetic fluid therein, an inlet pipe extending from a sealed relationship with said inlet opening into said magnetic fluid, a flow conduct connected to the inlet and outlet openings of said container, and means operatively associated with said container for supplying a magnetomotive force to said magnetic fluid, said preselected fluid and said magnetic fluid having differing values of specific gravity.

4. The device of claim 3 wherein said magnetic fluid is a liquid and said preselected fluid has a specific gravity greater than that of said magnetic liquid, whereby said magnetic fluid floats on the preselected fluid and said outlet opening is located below the lower level of magnetic liquid in said container.

5. In a valve, a body portion providing an interior chamber, magnetic oil in said chamber, a fluid inlet terminating in said oil, an outlet opening in said body above the surface of said oil, baffle means adjacent to said opening for restricting the flow of oil from said chamber, means associated with said body portion for subjecting said oil to the influence of a magnetic field and a flow conduit for fluid connected to said fluid inlet and to the outlet opening of said body portion whereby fluid may flow into and through said magnetic oil, said fluid having a lower specific gravity than said magnetic oil.

6. In a valve, a body portion providing an interior chamber, magnetic oil in the lower portion of said chamber, a fluid inlet passing through a wall of said body portion and terminating in said magnetic oil, an outlet opening in said body and above the surface of said oil, an electromagnet associated with said body for subjecting said oil to the influence of a magnetic field and a flow conduct for fluid connected to said fluid inlet and to the outlet opening of said body portion whereby fluid may flow into and through said magnetic oil, said fluid having a lower specific gravity than said magnetic oil.

7. In a valve, a body portion formed of nonmagnetic material and, providing an interior chamber, a colloidal suspension of iron powder in an oil partially filling said chamber, a fluid inlet sealed in said body portion and terminating in said suspension, an outlet opening in said body portion above the surface of said suspension, a baffle adjacent to said opening for restricting the flow of oil bubbles out through said opening, and means associated with said body portion for subjecting said colloidal suspension to the influence of a magnetic field and a flow conduit for fluid connected to said fluid inlet and to the outlet opening of said body portion whereby fluid may flow into and through said magnetic oil, said fluid having a lower specific gravity than said colloidal suspension.

8. The combination of claim 7 wherein said means comprises an electromagnet.

9. The combination of claim 7 wherein said means comprises a plurality of electromagnets.

10. The combination of claim 7 wherein said means comprises a coil around said body portion.

11. The combination of claim 7 wherein said fluid inlet constitutes a closed pipe having a portion adjacent its closed end and submerged within said magnetic oil provided with a plurality of perforations through which said fluid may flow into and through said colloidal suspension.

EDMUND GERMER.

References Cited in the file of this patent

UNITED STATES PATENTS

| Number | Name | Date |
|---|---|---|
| 2,505,049 | Keller | Apr. 25, 1950 |

OTHER REFERENCES

National Bureau of Standards Bulletin, June 1949.